United States Patent [19]

Papadopoulos

[11] Patent Number: 4,485,901

[45] Date of Patent: Dec. 4, 1984

[54] WINCH BRAKE ASSEMBLY

[76] Inventor: Georges E. Papadopoulos, Rua Visonte De Piraza, 284 Apt. 701, Ipanama, Rio De Janeiro, Brazil

[21] Appl. No.: 327,464

[22] Filed: Dec. 4, 1981

[30] Foreign Application Priority Data

Dec. 5, 1980 [BR] Brazil ........................ 8.008.000

[51] Int. Cl.³ ............................................. B60K 41/20
[52] U.S. Cl. .................................. 192/8 R; 254/378; 188/134
[58] Field of Search ............... 192/7, 8 A, 8 R, 15, 192/18 R; 242/107.4 B; 254/375, 378, 366, 356; 188/134

[56] References Cited

U.S. PATENT DOCUMENTS 2,834,443  5/1958  Olchawa ..................... 192/8 R
4,280,605  7/1981  Papadopoulos ............. 192/8 R

FOREIGN PATENT DOCUMENTS

8001127  9/1981  Brazil .

Primary Examiner—George H. Krizmanich
Assistant Examiner—M. Marley
Attorney, Agent, or Firm—Lockwood, Alex, Fitzgibbon & Cummings

[57] ABSTRACT

The drive release brake assembly having an axial core onto which are radially attached, equidistant and symmetrical cylinders in a quantity determined by use of the assembly, and a cam mechanism defining two identical cam surfaces held in place axially in relation to the core. The cam mechanism defines two identical cam surfaces axially held in place on any side of a locking cylinder mechanism these cam surfaces being rotatable in relation to the core. A mechanism rotates the cam surfaces between a first angularly aligned position, where the axial distance between the facing cam surfaces are equal in all angular positions; this axial distance in the aligned position being greater than the length of the locking cylinder mechanism in order to permit relative rotation between the cam surfaces and the core, and a second angularly unaligned position in which the axial distance in the unaligned position is less than the axial length of the locking cylinder mechanism in order to lock the locking cylinder mechanism between the cam surfaces by preventing the rotation of the cam surfaces.

8 Claims, 7 Drawing Figures

WINCH BRAKE ASSEMBLY

BACKGROUND AND SUMMARY OF THE INVENTION

The present invention addresses an improvement over the drive release brake assembly described in Brazilian Patent Application Ser. No. PI 8001127, filed Feb. 26, 1980 by the same inventor herein and which is now published.

The present invention generally refers to mechanical drive release brake assemblies to control relative rotation between rotary members. More particularly, it refers to those drive assemblies employed in hoists or similar things which require a type of automatic brake which prevents accidental release.

Hoists have numerous uses in elevators, winches and similar things. They can be mechanically or electrically driven and can be used jointly with a pulley, spool or cube to capture and thread line or with a winch to merely recapture line. In many uses, it is desirable that the drive assembly used in a hoist control be easy to operate, trustworthy, and durable. Besides this, it is desirable, and at times imperative, that the drive assembly have an automatic locking characteristic in order to prevent accidental release or discharge of the hoist line in case of motor failure.

Consequently, it is an object of the invention to provide a hoist which is sturdy and trustworthy, while not necessarily complicated or difficult to operate and maintain.

Another object of the invention is to provide a drive release brake assembly which can be used in a hoist with backward and forward motion, but which automatically locks against those motions in case of motor failure.

Yet another object of the invention is to provide a drive release brake assembly which is useful in combination with a line-threading pulley, winch or similar device.

BRIEF DESCRIPTION OF THE DRAWINGS

In the course of this description, the drawings will be frequently referred to in which.

DESCRIPTION OF THE PREFERRED EMBODIMENT

Referring to the figures, and in particular to FIGS. 1-6, a hoist 10 having a drive release brake assembly of the type previously known in the art and described in the aforementioned Brazilian Application is shown. To facilitate understanding of the present invention, operation of the prior art drive release brake assembly will now be described.

The hoist 10 is mounted on a support frame 16 only for illustration purposes. Naturally, the actual mounting would depend on the particular use to which the hoist 10 would be put, for example, in a crane on board a ship or in an elevator. In the method of operation illustrated, the hoist 10 is driven by a gear 19a mounted on an axle 22, the latter of which is supported on a bearing 20 on the frame 16 or by another support system depending on its use. The gear is driven by suitable means, such as a crank, motor or engine (not shown).

The hoist includes a sturdy drive release brake assembly which is easy to operate and which serves to control the rotation of the drum 14 in any direction and to firmly and automatically lock the drum against rotation once the motor fails or when any other interruption occurs, as for example, a power failure or when the motor is simply turned off.

Figure 1:
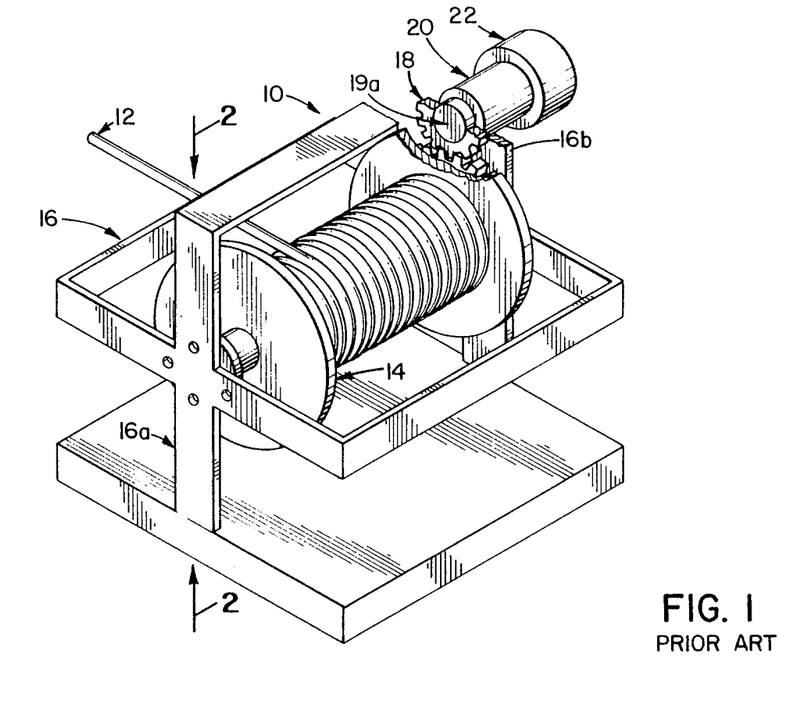
FIG. 1 is a perspective, partially broken view of a hoist employing a drive release brake assembly of the type previously known in the art.
Figure 2:
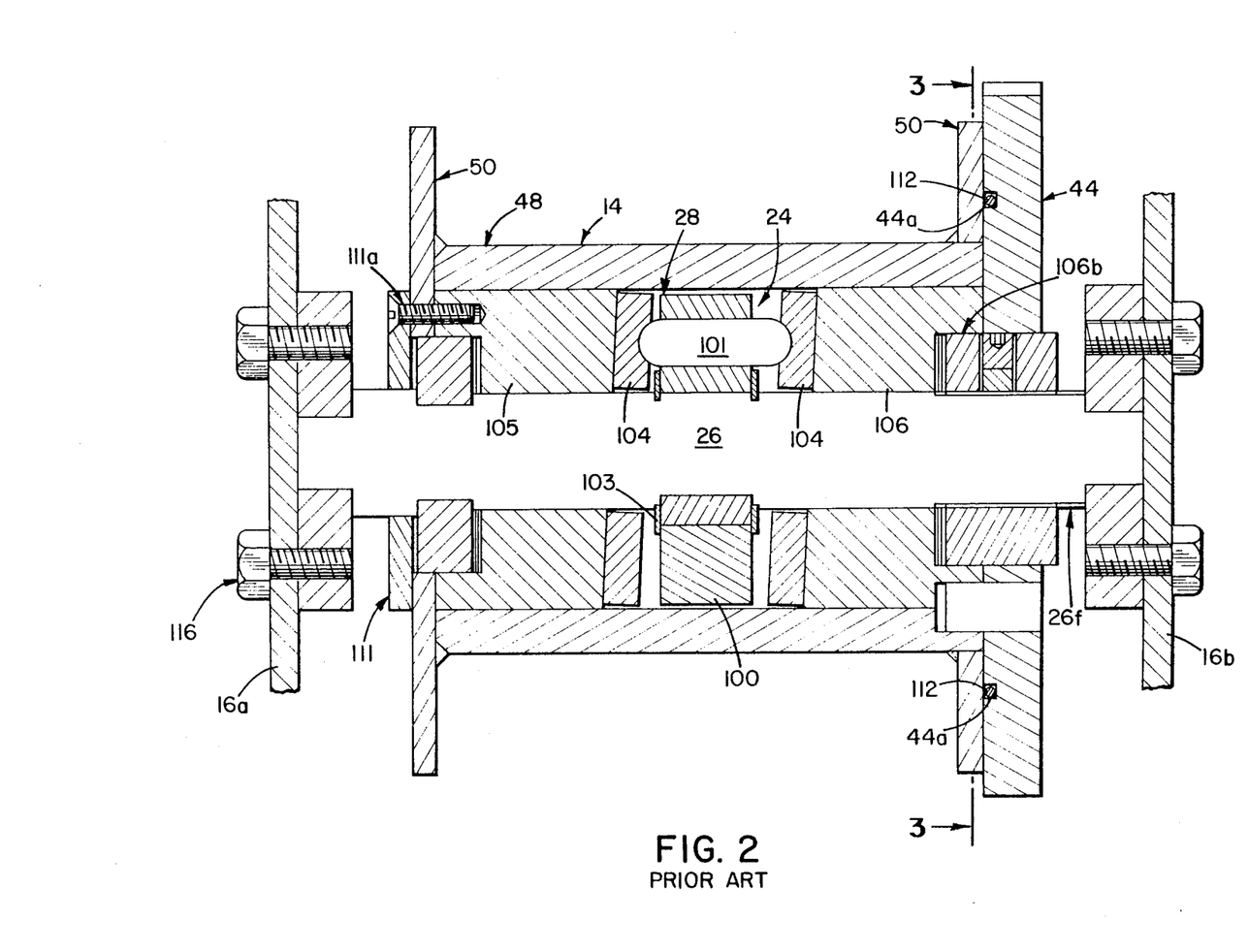
FIG. 2 is a cross-sectioned front elevational view of the hoist illustrated in FIG. 1 as viewed substantially along line 2—2 thereof.

As is best seen in FIG. 2, the drive release brake assembly has an axial core 26 mounted in a cylindrical bore 28 in the cable hub of the drum 14. A bored component 100, mounted on the axial core 26, is fixed and prevented from axial motion by elastic rings 103 housed in the openings 103a of the axial core 26 as shown in FIG. 6.

Figure 6:
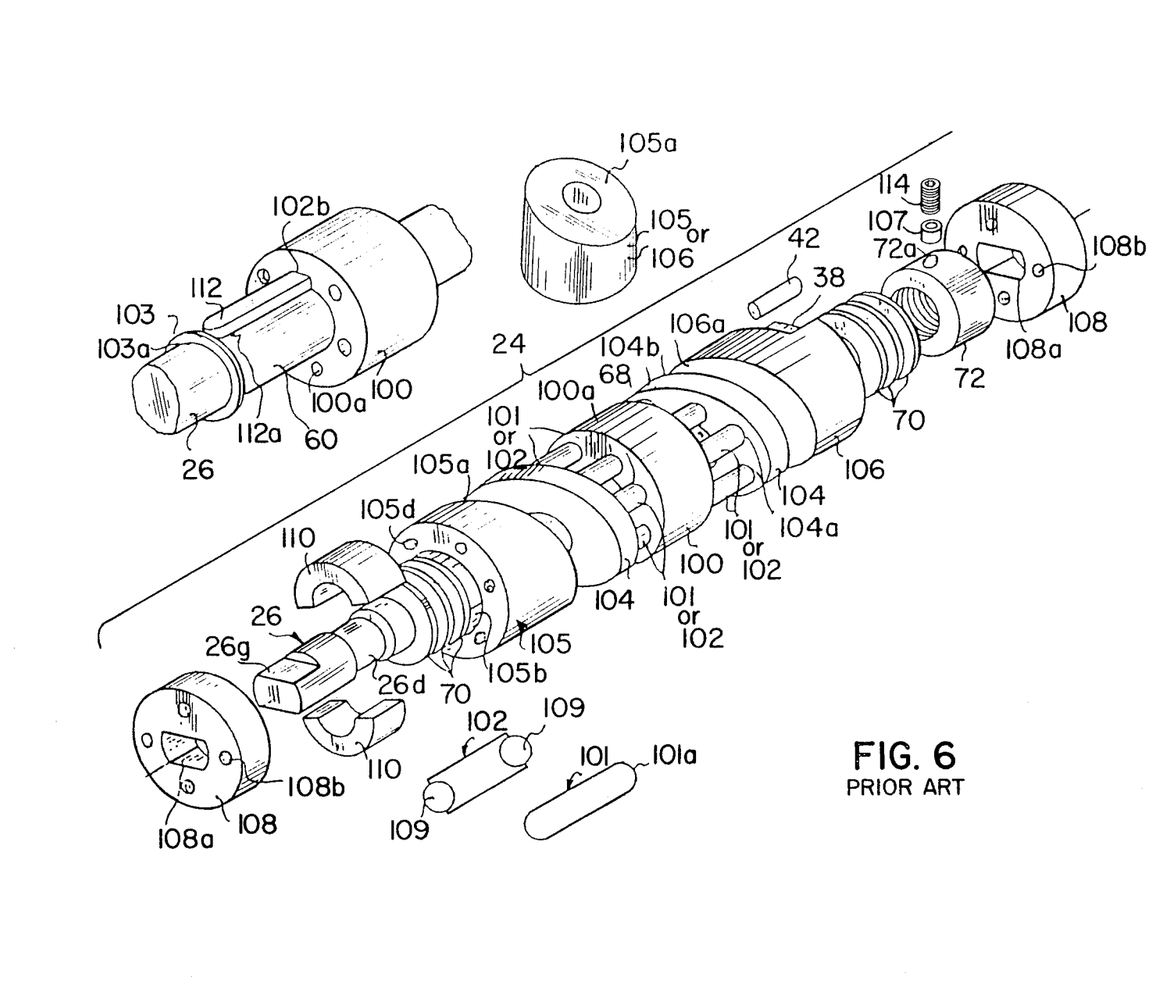
FIG. 6 is an exploded perspective view of the prior art drive release brake assembly of the hoist shown in FIG. 1.

Referring to FIG. 6, the bored component 100 has a series of cylindrical axial holes 100a into which either cylinders 101 with spherical ends 101a, or cylinders 102 with spherical balls 109 mounted in each extremity of the cylinder slide and revolve. The spherical extremities 101a of the cylinders or balls 109 at the ends of the cylinders opposite axial holes 100a are supported in concave channels 104a on a substantially planar cam surface in each of a pair of cam discs 104, the latter of which are mounted in spaced relationship on the axial core 26. Also positioned in spaced relationship along the core 26 are a pair of cam cylinders, 105 and 106, having slanted planes 105a or 106a respectively. Sliding discs 70, which revolve on the axial core 26 are mounted on an indentation 105b in slanted cam cylinder 105 opposite the inclined plane 105a. The slanted cam cylinder 105 is attached to the side of the drum 14 by screws in indentations 105d or by pins fastened in the identations 105d and in the side of the drum. Slanted cam cylinder 106 also revolves around the axial core 26, the latter of which is mounted in a central opening opposite the inclined plane 106a. Discs 70, which also revolve around the axial core 26, are positioned in indentation 106b (FIG. 2) and are prevented from detachment from the indentation 106b by a nut 72 (FIG. 6) which is attached to the axial core 26 by a cylinder 107 which is held in place by a screw 114, both being mounted in a threaded hole 72a as shown.

The axial core 26 is prevented from revolving because its extremity 26g is positioned in the opening 108a of supports 108, the latter of which are attached to the frame 16 by screws through holes 108b. The assembly is protected at one end by a plate 111 as shown in FIG. 2 attached to the drum 14 by screws through the openings 111a and 105d and at its opposite end by a rubber ring 112 housed in an indentation 44a of the gear 44.

The slanted surfaces 105a and 106a of cam cylinders 105 and 106 are spaced from each other such that when the surfaces of the cylinders are aligned at a 180-degree angle, i.e. with the highest part of one cylinder surface opposite to the lowest surface of the other cylinder, a small space is left between the slanted cam surfaces of the cam discs 104. However, when the cylinders are revolved out of alignment, the cylinders 101 and 102 are wedged between the cam surfaces of parallel cam discs 104 in order to lock the cylinders against rotation in relation to the axial core.

Figure 3:
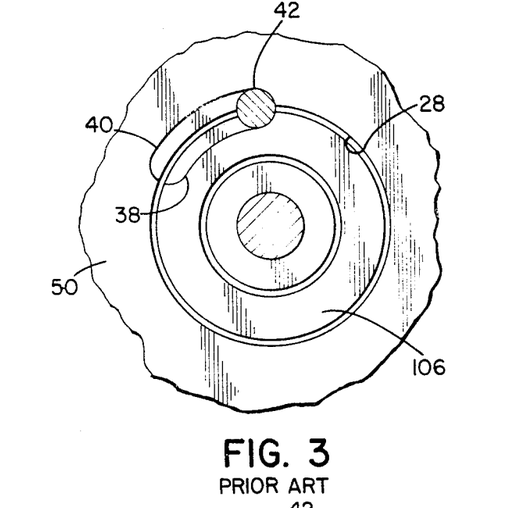
FIGS. 3 and 4 are vertical plan views, broken away from the rest of the hoist, as viewed substantially along line 3—3 of FIG. 2, which show the feature of the prior drive release assembly for unlocking and locking the clutch assembly respectively.
Figure 4:
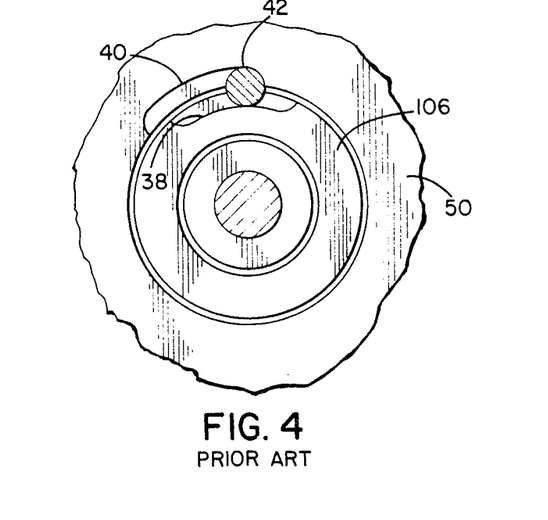
Figure 5:
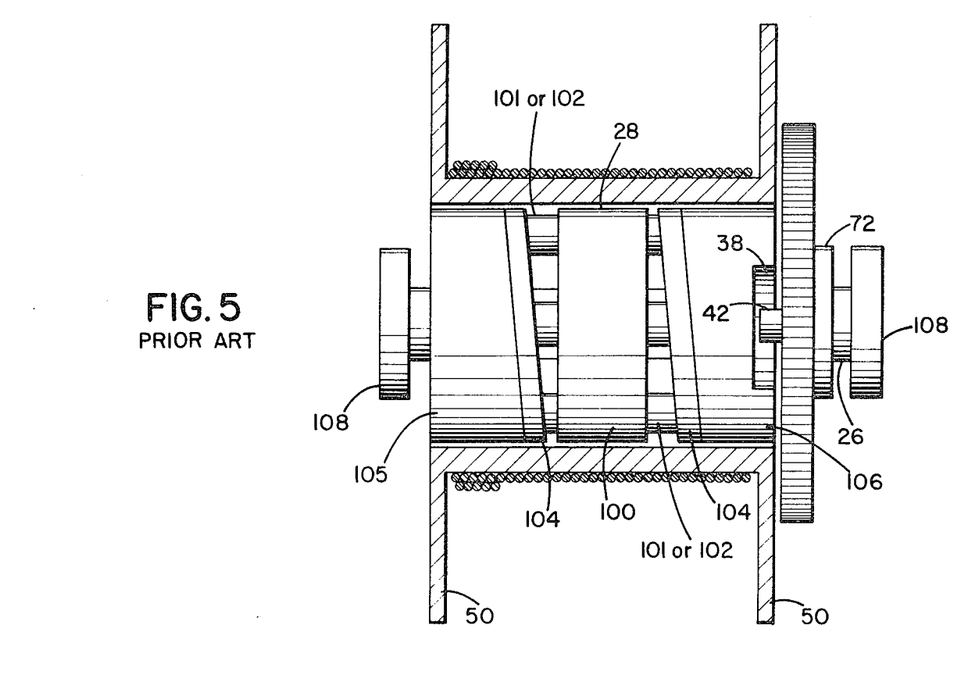
FIG. 5 is a horizontal sectioned view of the hoist assembly shown in FIG. 1.

Slanted cam cylinders 105 and 106 are displaced from their angularly aligned position, as shown in FIGS. 3, 4 and 5, by alignment of parallel grooves 38 and 40 in the peripheral edge of slanted cam cylinder 106 and drum 14. A pin 42 secured to the motor gear 44 extends into the space between the grooves 38 and 40 and rotation of the motor gear in whatever position causes the pin 42 to meet and align the extremities of the grooves. The slanted cam cylinder 105 is welded or secured in any suitable manner to the drum 14 in such a way that when the extremities of the grooves 38 and 40 are aligned, the slanted cam cylinders 105 and 106 are in angularly aligned relationship to each other. When the drive of the drum is stopped, either accidentally or intentionally, the slanted cam cylinders 105 and 106 rotate slightly into an unaligned position, closing the spacing between the cylinders 101 or 102 to the cam surfaces of the cam discs 104 and preventing the rotation of both the cylinders and the drum 14 in relation to the axial core 26.

Returning now to a more detailed description of the attached drawings, in the illustrated hoist, the retrieving drum 14 as illustrated in FIG. 2, is shown between a pair of straight support frame arms 16a and 16b. As mentioned previously, this mounting is simply for illustration purposes, and can be changed according to need and for whatever purpose the invention might be employed. The drum 14 includes a cylindrical hub 48 with straight radial flanges 50 on each extremity in order to retain the cable 12 (FIG. 1) on the drum. The drive release brake assembly 24 of the present invention is enclosed within a cylindrical axial bore 28 through the hub 48 of the drum. The axial core extends to each extremity of the drum and is connected to the straight arms 16a and 16b of the frame support 16. As shown in FIG. 2, the extremities of the axial core 26 are housed in the openings 108a of the discs 108 which are, in turn, attached to the frame structure 16 by bolts 116 as shown in FIG. 2, and thus prevent the rotation or axial movement of the axial core 26.

As briefly described above, the drive release brake assembly 24 is firmly encased in the bore 28 of the cable drum 14. FIG. 6 shows the axial core 26 with the other components of the clutch-brake in detail. The axial core 26 is generally long and cylindrical. It is threaded adjacent one end to permit mounting of the slanted cam cylinders 105 and 106 by means of a nut 72 and has a centrally located cylindrical part 60 which extends through the bored component 100 and slanted cam cylinders 105 and 106 and is made of high-resistance steel. The bore component 100 is attached and prevented from revolving about the axial core 26 by axle-pins 112 formed thereon and housed in the spaces 112a of the bored component 100 as shown in FIG. 6 and axial movement of component 100 is prevented by elastic rings 103 housed in the spaces 103a of the core 26. The bored component 100 has a series of cylindrical axial bores 100a which receive cylinders 101 with spherical extremities 101a or cylinders 102 with spherical balls 107 mounted in each extremity of the cylinders for sliding and rotating movement of the last-mentioned cylinders in bores 100a.

The size of the cylinders 101 and 102 is determined by the length of the bores 100a in component 100. The diameter of the cylinders 101 and 102 should be slightly smaller than the bores in component 100 to allow for sliding, rotation and axial displacement to occur within the bores 100a of component 100. In addition, cylinders 101 and 102 jointly should be a total length, measured along the axial core, sufficient to allow their closest point to extend close to the sides of the bored component 100 and for the ends of cylinders 101 or 102 to extend into the channels 104a of the discs 104. It is only necessary that the cylinders 101 or 102 extend beyond the bores 100a sufficiently to allow them to touch the channel surfaces 104a of the cam discs 104 and, preferably, the cam surfaces of the cam discs 104 do not touch or rub against the extremities of component 100.

Each slanted cam cylinder 105 and 106 has a central bore for positioning on the axial core 26. The cam surfaces of the parallel cam discs 104 are identical, but the spacing between the discs 104 will change when they are rotated from their parallel alignment causing the slanted cylinders to quickly lock. That is, when the cam discs 104 are revolved out of alignment, the assembly is braked or locked.

Slanted cam cylinder 105 is mounted over axial core 26 by its central bore and prevented from axial movement by sliding washers 70 which are housed in the indentation 105b and kept there by semi-sleeves 110 housed in the indentation 26d of axial core 26 as shown in FIG. 6. The position of the slanted cam cylinder 105 in relation to the component 100 is maintained by the axial force exercised by cam disc 104 on the surface 105a.

Similarly, the slanted cam cylinder 106 is mounted over axial core 26 by its central bore and prevented from axial movement by the sliding washers 70 which are housed in a similar indentation; 106b (FIG. 2) and maintained there by a cylindrical nut 72 attached to the axial core by threading onto section 26f of the core as shown in FIGS. 2 and 6. The position of the slanted cam cylinder 106 in relation to component 100 is maintained by the axial force exercised by disc 104 on the surface 106a.

The slanted cam cylinders 105 and 106 and the cam discs 104 are mounted such that the cylinders 101 and 102 stay positioned and supported in the channels 104a and allow rotation of the cylinders and the radial sliding of the cam discs 104. That adjustment is made by the advance or backward movement in relation to the component 100 of the cylindrical nut 72 which, after adjustment, is rigidly attached to the axial core 26 by cylinder 107 which is attached by the screw 114. In brief reference to FIG. 2, a locking nut is not necessary for nut 72 because disc 108 prevents accidental loosening of the nut 72.

Except for the parts at the extremities of the axial core, all of the assembly 24 shown in FIG. 6 is mounted in bore 28 in the drum 14 with the external surfaces of the slanted cam cylinders 105 and 106 flush with the drum flanges 50 as shown in FIGS. 2 and 5. In order to control the rotation of the drum, the slanted cam cylinder 105 is firmly connected to the drum by welding, screws, or the like. Movement of the slanted cam cylinders to an aligned angular position in order to free the drum to dispense the cable is accomplished by the use of a pin 42 to align the extremities of the parallel grooves 38 and 40 on the peripheral external rim of the slanted cam cylinder 106 and on the interior of hub 48, respectively. This is probably shown best in FIGS. 2, 3 and 4. Pin 42 is firmly attached to the motor gear 44 which is driven by gear 18 which, in turn, is driven by axle 22. Pin 42 resides in an opening which is defined by the two parallel grooves 38 and 40. The slanted cam cylinder 105 is welded or otherwise attached to the drum 14 in an appropriate angular position in relation to space 40 in such a way that when the groove extremities between the drum and the slanted cam cylinder 106 are aligned, the slanted cam cylinders can be aligned in an angular position which allows rotation of the slanted cam cylinders and, thus, of the drum in relation to the axial core 26. Movement of the gear 44 in either forward or reverse, causes movement of the pin 42 within the space, which causes the alignment of the groove extremities, thus, freeing the drum to roll or unroll the cable. If the gear stops for some mechanical reason so that the pin stops forcing the groove extremities to align, the tension on cable 12 causes the slanted cam cylinder 106 to immediately move out of the aligned angular position as shown in FIG. 4. When this happens, the space between the surfaces of cam discs 104 becomes smaller than the length of cylinders 101 or 102, resulting in at least one cylinder 101 or 102 being tightly wedged between the surface of the discs, locking them and the drum from rotating in relation to the axial core 26. Because the core is fixed in relation to the support frame 16, the rotation of the drum is also prevented in relation to the support frame.

In order to clearly visualize the operation of the drive release brake assembly, it should be noted that when the surfaces of the slanted cam cylinders 105 and 106 are angularly aligned, the slanted cam cylinders and drum 104 are revolving in relation to core 26, and the cylinders 101 or 102 are supported in the channels 104a of the cam discs 104 and are actually oscillating back and forth in the bores 100a of component 100. Since the diameter of the bores 100a allows cylinders 101 or 102 to revolve on their own axis, the contact between the channels 104a of the cam discs 104 and the ends of cylinders 101 and 102 make the cylinders move in a rotating motion while they oscillate which results in significantly less wear than simple sliding contact of the cylinders against the cam surfaces of cam discs 104. It should be noted that while lubrication will help reduce wear even more, it will not adversely effect the locking action of the clutch-brake mechanism which is caused by the tight fit of cylinders 101 and 102 between the slanted cam cylinders.

The present invention concerns a modification which improves the aforementioned system principally in the reduction of a number of components, ease of fabrication and, at the same time, increases safety by virtue of the reduction in wear as well as in fewer components used.

Basically, in the central part of the assembly just described, cam discs 104, bored component 100, and cylinders 101 or 102 have been eliminated from the axial core 26. In accordance with the present invention, a pair of locking cylinders 120 have been added to the areas formerly occupied by the eliminated components while the bored component 100 has been replaced with a cylindrical collar 26a affixed to axial core 26 as illustrated in FIG. 7.

The entire external system remains the same as that utilized in the prior art and previously described including the process of motion and use.

Figure 7:
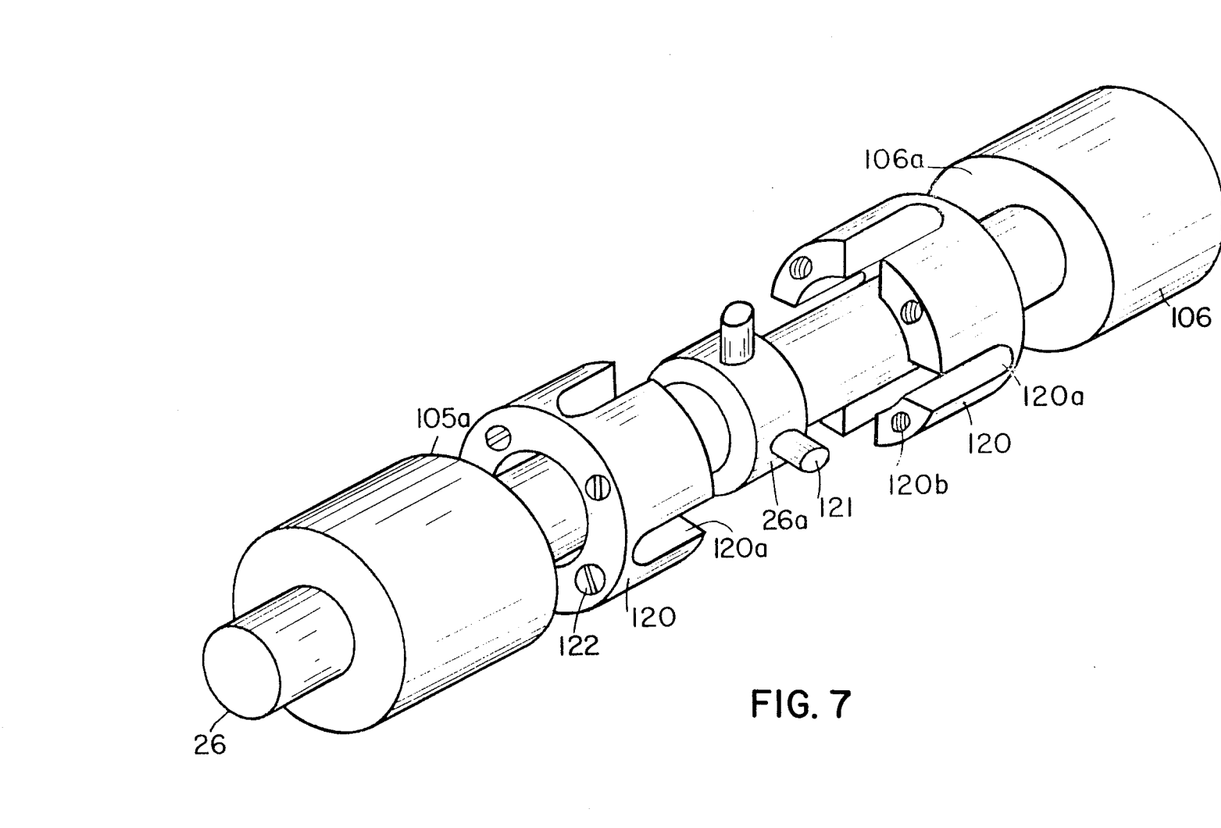
FIG. 7 is an exploded detailed view of the improved drive release brake assembly constructed in accordance with the invention.

As illustrated in FIG. 7, the cylindrical sleeve 26a comprises a generally cylindrical member having an external diameter greater than that of the axial core 26. A plurality of pins 121, having a cylindrical or elliptical cross-section, extend radially from the sleeve 26a in the manner shown.

Locking cylinders 120 each comprise a generally cylindrical sleeve having an axial bore therethrough of diameter somewhat larger than that of either axial core 26 or sleeve 26a. Accordingly, locking cylinders 120 may slide axially with respect to axial core 26. As shown in FIG. 7, each of the locking cylinders 120 is provided with a plurality of slots 120a positioned and dimensioned as to receive pins 121 which extend radially from sleeve 26a. One such slot is provided in each locking cylinder for each of the pins 121. The dimension of each slot is sufficient to allow the passage of the pins 121 therethrough.

As shown in FIG. 7, the two locking cylinders 120 are positioned over the axial core 26 and are bolted to one another by means of bolts 122 and threaded recesses 120b. The locking cylinders are attached to one another so that the slots 120a provided in each are aligned thereby forming a continuous slot for receiving each of the pins 121. It will be appreciated by reference to FIG. 7, that when the locking cylinders are installed on axial core 26 in this manner, a substantially one-piece unit is thereby formed which may slide axially relative to the axial core 26 but which is precluded from rotating relative to the core by reason of pins 121 engaging slots 120a. The locking cylinders 120 thus provided form locking means which are axially movable on the axial core.

By reference to FIG..7, it will be appreciated that the locking means thus formed must have a linear dimension sufficiently small as to allow cam cylinders 105 and 106 to rotate relative to axial core 26 when their respective slanted surfaces 105a and 106a are aligned, while having a linear dimension sufficiently great to cause the locking mechanism to be wedged between cam cylinders 105 and 106 when their respective slanted surfaces are unaligned. For example, the surface of locking cylinder 120 opposite slanted surface 105a of cam cylinder 105 may be aligned parallel to slanted surface 105a as shown in FIG. 7, while the surface of the opposite locking cylinder which faces slanted surface 106a of cam cylinder 106 may be slanted away from slanted surface 106a as shown. It will be appreciated by those skilled in the art that other configurations may be utilized, it only being necessary that the locking mechanism be dimensioned to permit rotation of the cam cylinders when their slanted surfaces are aligned and to prevent such rotation when the surfaces are not aligned.

During free rotation of the drum 14, cam cylinder 106 will be aligned with cam cylinder 105 by means of pin 42 and grooves 38 and 40 in the manner previously discussed. Accordingly, since surfaces 105a and 106a are aligned, cam cylinders 105 and 106 are each free to rotate about axial core 26 thereby permitting drum 14 to rotate. When drive to the drum 14 is removed, cam cylinder 106, in the manner previously discussed, will become misaligned with respect to cam cylinder 105 with the effect that the locking mechanism formed by locking cylinders 120 becomes wedged between slanted surfaces 105a and 106a. Since the locking mechanism is precluded from rotating relative to axial core 26 by reason of pins 121 being received in grooves 120a, rotation of cam cylinders 106 and 105 is thereby precluded when the locking mechanism is wedged between their respective slanted surfaces 105a and 106a.

It will be appreciated that when the slanted surfaces 105a and 106a of cam cylinders 105 and 106 are aligned, the locking mechanism formed by locking cylinders 120 will oscillate linearly back and forth along the axis of axial core 26 as the locking mechanism follows the aligned slanted surfaces of each cam cylinder. It will also be appreciated that considerably fewer parts are required with the improved brake mechanism thereby resulting in greater reliability and economy of manufacture.

I claim:

1. A brake assembly comprising:
   relatively stationary axial core means;
   pin means extending radially from said axial core means and fixed thereto;
   cam means defining a pair of spaced-apart substantially identical cam surfaces axially carried on said axial core means, said cam means thereby defining an axial distance between said cam surfaces, said cam surfaces having substantially planar surfaces and being rotatable relative to said core means and to one another;
   locking means disposed between said cam surfaces and axially movable on said axial core means, said pin means guiding the axial movement of said locking means, but preventing rotation of said locking means relative to said axial core means;
   means for rotating said cam surfaces between a first angularly aligned position where said axial distance between said cam surfaces is substantially equal in all angular positions, and a second position out of angular alignment, said axial distance in said aligned first position being greater than the axial length of said locking means to permit relative rotation between said cam surfaces and said axial core means, said axial distance in said second unaligned position being less than the axial length of said locking means to wedge said locking means between said cam surfaces to prevent the rotation of said cam surfaces relative to said core means.

2. The brake assembly of claim 1 wherein said locking means is cylindrical and said axial core extends through said cylindrical locking means in coaxial alignment therewith.

3. The brake assembly of claim 1 wherein said locking means includes at least one opening therein, and said pin means extends radially through said opening.

4. The brake assembly of claim 3 wherein said opening comprises a slot extending in a direction substantially parallel to said axial core.

5. The brake assembly of claim 1 wherein said pin means comprise a plurality of pins extending radially from said axial core in substantially equidistant spacing from each other, and a plurality of openings in siad locking means also spaced substantially equidistant from each other about said locking means, said pins extending into each of said openings.

6. The brake assembly of claim 5 wherein each of said openings comprises a slot extending in a direction substantially parallel to said axial core.

7. The brake assembly of claim 1 wherein said locking means comprises a pair of cylinders, and coupling means coupling said cylinders together, said axial core extending through said last mentioned cylinders.

8. The brake assembly of claim 7 wherein said pin means comprise a plurality of pins extending radially from said axial core in substantially equidistant spacing from each other, and a plurality of openings in each of said cylinders of said locking means also spaced substantially equidistant from each other about said cylinders, the openings in one of said cylinders of said locking means coinciding with the openings in the other of said cylinders to define slots extending in a longitudinal direction substantially parallel to said axial core, said pins extending into each of said slots.

* * * * *